United States Patent
Atkinson et al.

[11] 3,867,455
[45] Feb. 18, 1975

[54] PREPARATION OF PHENYLAMINOETHANOLS
[75] Inventors: Michael Atkinson; David Hartley, both of London, England
[73] Assignee: Allen & Hanburys Limited, London, England
[22] Filed: Dec. 14, 1973
[21] Appl. No.: 424,711

Related U.S. Application Data
[63] Continuation of Ser. No. 142,747, May 12, 1971.

[30] Foreign Application Priority Data
June 2, 1970   Great Britain.................... 26523/70

[52] U.S. Cl. .......................................... 260/570.6
[51] Int. Cl. ........................................... C07c 91/16
[58] Field of Search ................................ 260/570.6

[56]   References Cited
   OTHER PUBLICATIONS
Martin, "Journal American Chemical Society," Vol. 74, pages 3024–3025 (1952).

Primary Examiner—Robert V. Hines
Attorney, Agent, or Firm—Bacon & Thomas

[57]   ABSTRACT

A process for the preparation of phenylaminoethanol derivatives of the formula I:

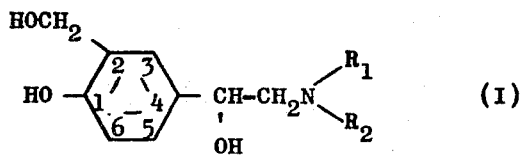

in which $R_1$ represents a hydrogen atom or a benzyl group;
and $R_2$ represents a hydrogen atom or a straight or branched chain alkyl radical containing from 1 to 6 carbon atoms or an arylalkyl radical which comprises treating a compound of the formula II:

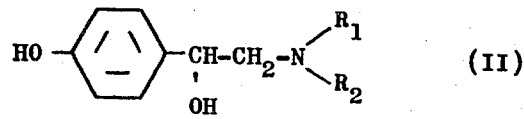

in which $R_1$ and $R_2$ have the meanings given above with formaldehyde or a formaldehyde yielding compound in the presence of a strong base and an alkali metal borate.

3 Claims, No Drawings

PREPARATION OF PHENYLAMINOETHANOLS

This is a continuation of application Ser. No. 142,747, filed May 12, 1971.

This invention relates to a process for the preparation of certain phenylaminoethanol derivatives.

We have found that phenylaminoethanol derivatives of the formula I may be prepared from compounds of the formula II in which $R_1$ and $R_2$ have the meanings given by treatment with formaldehyde in the presence of a strong base and an alkali metal borate.

The invention therefore provides a process for the preparation of phenylaminoethanol derivatives of the formula I:

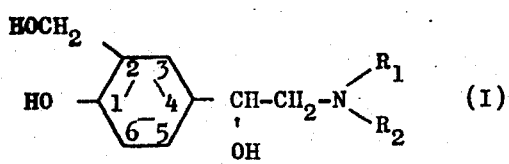

in which $R_1$ represents a hydrogen atom or a benzyl group; and $R_2$ represents a hydrogen atom or a straight or branched chain alkyl radical containing from 1 to 6 carbon atoms or an arylalkyl radical; which comprises treating a compound of the formula II:

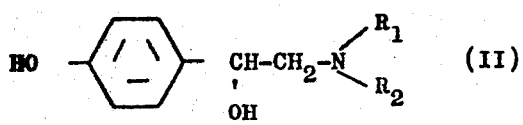

in which $R_1$ and $R_2$ have the meanings given with formaldehyde or a formaldehyde yielding compound in the presence of a strong base and an alkali metal borate.

The presence of an alkali metal borate unexpectedly leads to selective monohydroxymethylation in the 2 position, rather than hydroxymethylation in both the 2 and 6 positions.

In carrying out the reaction formaldehyde itself or any suitable source of formaldehyde such as paraformaldehyde may be used. An aqueous solution of formaldehyde, for example 40% Formalin is preferred. The reaction is carried out in the presence of a strong base, preferably an alkali metal hydroxide such as sodium hydroxide, and an alkali metal borate, in particular sodium borate. The reaction is preferably carried out at ambient temperature in aqueous solution.

The compounds of formula I are described in United Kingdom Patent Specification No. 1,200,886 as intermediates in the preparation of phenylaminoethanols of formula III which are β-adrenergic stimulants and useful as bronchodilators.

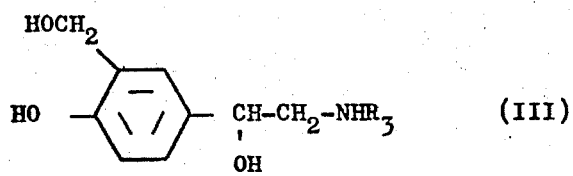

The catalytic hydrogenolysis of compounds (I) ($R_1 =$ $PhCH_2$, $R_2 =$ tert. butyl or $PhCH_2$) to give compounds (III) ($R_3 =$ tert. butyl or H) and the reductive alkylation of the latter with aldehydes or ketones to products (III) in which $R_3$ can have a variety of meanings e.g. p-methoxy-α-methylphenethyl are described therein.

The process according to the invention has the advantage over the known processes for the preparation of these compounds (see Example 16 of United Kingdom Patent Specification No. 1,200,886) in that the introduction of the hydroxymethyl group takes place in a single step.

The following Examples illustrate the invention:

EXAMPLE 1

α¹-(Benzyl-tert-butylaminomethyl)-4-hydroxy-m-xylene-α¹,α³-diol

α-(Benzyl-tert-butylaminomethyl)-4-hydroxy-benzyl-alcohol, hydrochloride (1.0 g) was added to a solution of sodium hydroxide (0.24 g) in water (50 ml) and dioxan (20 ml) and the mixture stirred until a clear solution was obtained. A solution of sodium borate (2.3 g) in water (50 ml) and 36% formaldehyde (5 ml) was added and the solution kept at room temperature until all the substrate had reacted (7 - 25 days). The reaction mixture was acidified by the addition of 2N hydrochloric acid and then basified with an excess of 8% sodium bicarbonate. The product was extracted into ethyl acetate, washed with brine, and dried ($Na_2SO_4$). Concentration gave a clear oil, which slowly crystallised. Recrystallisation from ethyl acetate - petroleum ether (b.p. 60–80°) gave α¹-benzyl-tert-butylaminomethyl-4-hydroxy-m-xylene-α¹,α³-diol (0.35 g; 35%) m.p. 118°–119°. Melting point was not depressed when mixed with an authentic sample isolated from the procedure described in Example 16 of United Kingdom Patent Specification No. 1,200,886.

EXAMPLE 2

α¹-(Dibenzylaminomethyl)-4-hydroxy-m-xylene-α¹,α³-diol

Sodium hydroxide (1N) (2 ml) and dioxan (15 ml) were added to a suspension of α¹-(dibenzylaminomethyl)-4-hydroxy-benzyl-alcohol (0.666 g) in water (15 ml) and the mixture was stirred until a clear solution was obtained. A solution of sodium borate (0.76 g) in water (10 ml) and 36% formaldehyde (5 ml) was added and the solution kept at room temperature until all the substrate had reacted (7 - 25 days). The reaction mixture was acidified by the addition of 2N hydrochloric acid and then basified with excess 8% sodium bicarbonate. After dilution with an equal volume of water the white precipitate was filtered off and air dried. The solid was dissolved in ethyl acetate, filtered through a short column of silica and the filtrate and washings were combined and dried ($Na_2SO_4$). Concentration of the solution gave a white solid which was crystallised from ethyl acetate-cyclohexane to yield α¹-dibenzylaminomethyl-4-hydroxy-m-xylene-α¹,α³-diol (0.3 g) m.p. 108°–110°. Melting point was not depressed when mixed with an authentic sample, prepared according to Example 33 of United Kingdom Patent Specification No. 1,200,886. This may then be debenzylated by the procedure described in Example 21 of said United Kingdom Patent Specification to give α¹-amino-methyl-4-hydroxy-m-xylene-α¹,α³-diol ($R_1 = R_2 = H$). This compound may then be reductively alkylated according to the procedure described in Exam-

What is claimed is:

1. A process for the preparation of a phenylaminoethanol derivative of the formula:

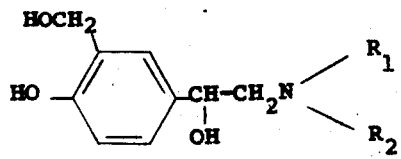

wherein:
R₁ is a hydrogen atom or a benzyl group, and
R₂ is a hydrogen atom, a straight or branched chain alkyl radical containing from 1 to 6 carbon atoms, or an arylalkyl radical, which comprises treating a compound of the formula:

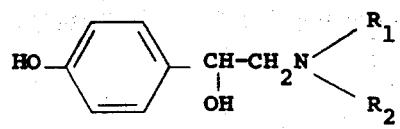

wherein:
R₁ and R₂ are as defined above with a aqueous solution of formaldehyde at ambient temperature in the presence of an alkali metal hydroxide and sodium borate.

2. A process for the preparation of $\alpha^1$-(benzyl-tert-butylaminomethyl)-4-hydroxy-m-xylene-$\alpha^1,\alpha^3$-diol which comprises reacting $\alpha$-(benzyl-tert-butylaminomethyl)-4-hydroxy-benzyl alcohol with formaldehyde in the presence of sodium borate and sodium hydroxide.

3. A process for the preparation of $\alpha^1$-(dibenzylamino-methyl)-4-hydroxy-m-xylene-$\alpha^1,\alpha^3$-diol which comprises reacting $\alpha^1$-(dibenzylaminomethyl)-4-hydroxybenzyl alcohol with formaldehyde in the presence of sodium borate and sodium hydroxide.

* * * * *